Figure 1:
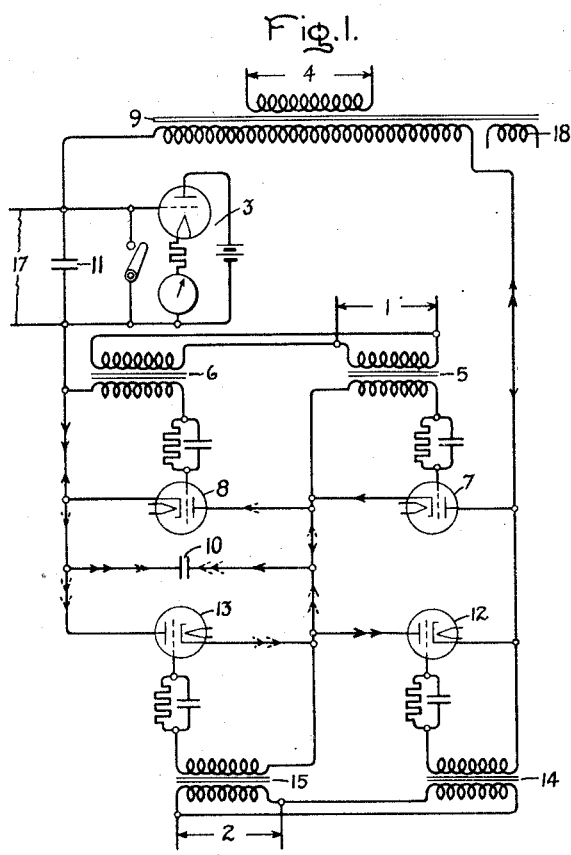

Jan. 8, 1946.       T. M. BERRY       2,392,632
FREQUENCY DIFFERENCE MEASUREMENT
Filed June 17, 1944       2 Sheets-Sheet 1

Inventor:
Theodore M. Berry.
by Harry E. Dunham
His Attorney.

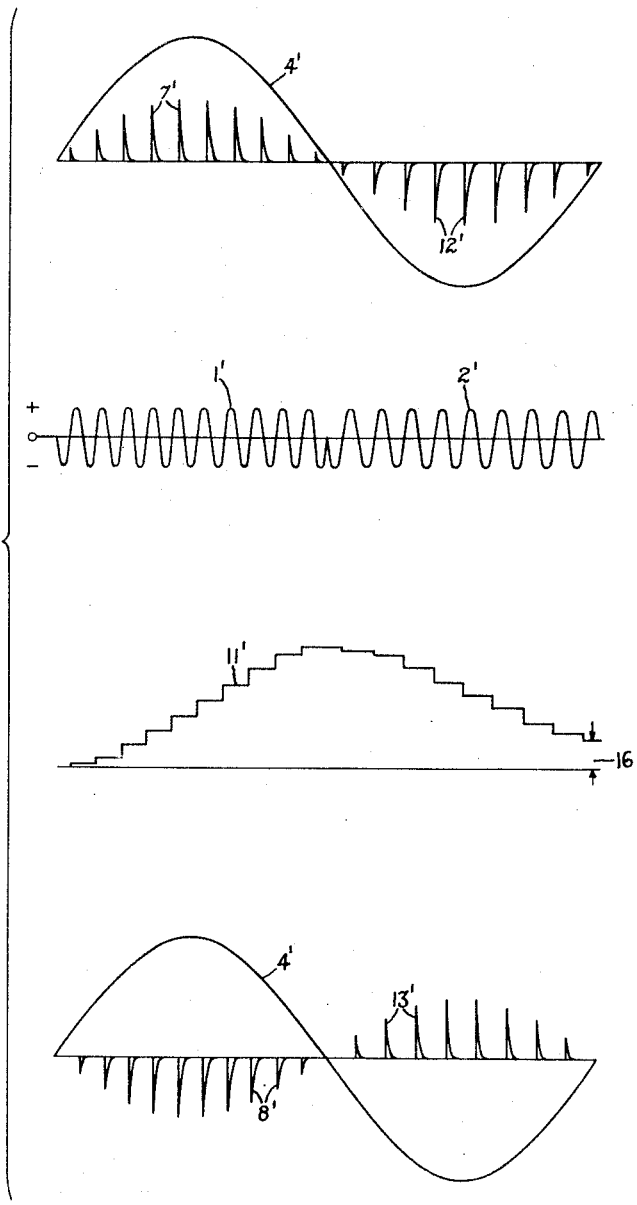

Patented Jan. 8, 1946

2,392,632

UNITED STATES PATENT OFFICE 2,392,632

FREQUENCY DIFFERENCE MEASUREMENT

Theodore M. Berry, Schenectady, N. Y., assignor to General Electric Company, a corporation of New York Application June 17, 1944, Serial No. 540,875

3 Claims. (Cl. 320—1)

My invention relates to an electronic system for obtaining a measurement of the difference in frequency between two alternating current systems, and it is the object of my invention to provide a system of the class described which is relatively simple and of high accuracy.

The features of my invention which are believed to be novel and patentable will be pointed out in the claims appended hereto. For a better understanding of my invention, reference is made in the following description to the accompanying drawings in which Fig. 1 represents a preferred embodiment of my invention, and Fig. 2 represents coordinated frequency and charging current curves explanatory of my invention.

In the drawings 1 and 2 represent two alternating current systems having frequencies $f_1$ and $f_2$. A measurement proportional to the difference in such frequencies is obtained on the vacuum tube voltmeter 3. At 4 is a source of alternating current supply. The frequency of the supply source 4 should be selected so that it is appreciably lower than the lowest of the frequencies $f_1$ and $f_2$. For example, if the frequencies $f_1$ and $f_2$ are 1200 and 1080 or higher, a commercial 60-cycle source 4 may be used for the supply. The source 1 of $f_1$ frequency feeds a pair of transformers 5 and 6. The secondary of transformer 5 controls the current conduction of a vacuum tube 7 and the secondary of transformer 6 controls the current conduction of a vacuum tube 8. It is noted that the transformers 5 and 6 are reversely connected to the control grids of tubes 7 and 8 so that tube 7 can only conduct current on one half-cycle of source 1 of $f_1$ frequency and tube 8 on the reverse half-cycle of source 1 of $f_1$ frequency. The plate circuit of tube 7 is supplied from the secondary of a transformer 9 fed from the source of supply 4, and when tube 7 conducts the current passing therethrough charges condensers 10 and 11 in series. When tube 8 conducts, it provides a discharge circuit for condenser 10. It is to be noted that tube 7 can conduct current only when the source of supply voltage thereto from transformer 9 is in the proper direction. That is, tube 7 can conduct during one half-cycle of source 4 but not during the reverse half-cycle. Thus, if we assume that the supply source 4 is 60 cycles and that source 1 is 1200 cycles, the action of the apparatus thus far described is to cause condensers 10 and 11 to be charged in a given direction, which I will call positive, $$\frac{1200}{2\times 60}=10$$

times on the positive half-cycles of source 1 during the positive half-cycle of the 60-cycle source 4, and to cause condenser 10 only to be discharged every time it is charged on the negative half-cycles of source 1. This charging current path for condensers 10 and 11 is represented by single full line arrowheads, and this discharge circuit path for condenser 10 by single dotted line arrowheads.

Also associated with condensers 10 and 11 and source of supply 4 are the electron discharge tubes 12 and 13 whose control grids are controlled from the secondaries of transformers 14 and 15, the primaries of which are energized from source 2 having the frequency $f_2$. The transformers 14 and 15 are reversely connected to the control grids of tubes 12 and 13 so that the tubes can conduct only on alternate half-cycles of the source 2. Also it is noted that tubes 12 and 13 are reversely connected to the source of supply 4 and condenser 10 as compared to tubes 7 and 8. Hence, tube 12 can pass current from source 4 only on the negative half-cycles of source 4, and the path of such current through condensers 10 and 11 is represented by double full line arrows, from which it is noted that this current passes through condenser 11 in the opposite direction as compared to the current from source 4 passed by tube 7. Thus the current passed by tube 12 is in a direction to discharge or reverse the charge on condenser 11 built up thereon by the controlling action of tubes 7 and 8 and frequency $f_1$ from source 1. Tube 13 serves to discharge the charges on condenser 10 left thereon when tube 12 passes current, and the path of tube 13 current is represented by double dotted line arrowheads. If it be assumed that the frequency of source 2 is 1080 cycles, condenser 10 will be charged by tube 12 and discharged by tube 13

$$\frac{1080}{60\times 2}=9$$

times during each negative half-cycle of the source of supply 4, tube 12 charging condenser 10 and tube 13 discharging condenser 10 on reverse half-cycles of the source 2.

The action resulting from the operation and frequencies assumed during a full cycle of the 60-cycle source of supply 4 is represented in the curves of Fig. 2. In Fig. 2, 4' represents a full-cycle voltage wave of source 4, 1' represents the 10 cycles of the source 1 voltage which occur during the positive half-cycle of wave 4', and 2' represents the nine cycles of the source 2 voltage which occur during the negative half-cycle of the wave 4'. At 7' during the positive half-cycles of wave 1' in the upper curve are represented the charging currents of condensers 10 and 11 through tube 7, and at 8' during the negative half-cycles of wave 1' shown in the lower curve are represented the discharge currents of condenser 10 through tube 8. Since the charging current through tube 7 accumulates on condenser 11, this is represented in the center curve 11' which rises over the positive half-cycle of curve 4'. During the negative half-cycle of curve 4' tube 12 passes current through condensers 10 and 11 in a direction to reduce the charge on condenser 11. These charge reducing currents are represented at 12' during the negative half-cycle of curve 4' and are only nine in number corresponding to the frequency assumed for source 2, curve 2'. At 13' in the lower curve are represented the current pulses through tube 13 which serve to discharge the negative charges on condenser 10 during the negative half-cycle of curve 4'. The descending stepped portion of central curve 11' over the negative half-cycle of wave 4' represents the nine discharge pulses of condenser 11 occurring during the negative half-cycle of wave 4'. The condenser 10 is small as compared to the condenser 11 and is fully charged and discharged and measures the charges which are both added to and subtracted from condenser 11, and these measurements vary only if the charging voltage varies. The charging currents are independent of the voltage or wave shape of the $f_1$ and $f_2$ voltages. As a result the average voltage charge remaining on condenser 11 depends upon the difference in frequency of the sources 1 and 2. As can be seen in Fig. 2, at the end of the cycle 4' assumed, there remains a charge on condenser 11 represented by the distance 16. It was assumed in the example given that we started out with zero voltage across condenser 11. At the beginning of the second cycle of the 60-cycle source there will remain a residual voltage on condenser 11, and in subsequent cycles this will increase until it becomes constant. The average voltage of condenser 11 will then be equal to the average voltage of source 4 multiplied by the ratio of the difference to the sum of the frequencies of sources 1 and 2.

Thus the average charging voltage for frequency $f_1$ is equal to the voltage across the secondary of transformer 9, designated $E_9$, plus the average of the voltage of condenser 11, designated $E_{11}$, and for the frequency $f_2$ is equal to $E_9 - E_{11}$. Under the steady-state condition the average charging current of condenser 11 due to $f_1$ per complete cycle of $E_9$ must be equal to the average discharge current thereof due to $f_2$ during the same period, since no direct current flows through condenser 11.

Hence, $$f_1(E_9 + E_{11}) = f_2(E_9 - E_{11})$$

$$E_9(f_1 - f_2) = -E_{11}(f_1 + f_2)$$

$$E_{11} = -E_9\left(\frac{f_1 - f_2}{f_1 + f_2}\right)$$

To review the operation of the circuit briefly, the condenser 10 is charged and discharged through one pair of tubes 7 and 8, while the supply voltage from 9 is of one polarity at a frequency $f_1$. During the time the supply voltage from 9 is of the reverse polarity, the same condenser 10 is charged and discharged at a frequency $f_2$. The charging currents due to $f_1$ and $f_2$ pass in opposite directions through condenser 11 and a direct current voltage will build up thereon which depends upon the frequency difference of the input voltages $f_1$ and $f_2$. It is apparent that the operation is not dependent upon the exact value of condenser 10 or of changes in its capacitance due to temperature changes, for example, since it is used for both frequencies and any change in this condenser will influence all operations to the same extent. Likewise, the same source of supply from transformer 4 is used, and hence, the result is not influenced by changes in frequency or wave form, and only to a minor extent by changes in voltage of such source of supply. If the $f_1$ and $f_2$ frequencies are equal, the voltage across condenser 11 will become zero and its polarity will reverse when $f_1$ changes from a value below to above that of frequency $f_2$. Hence, with a null method of control where it is desired to keep the two frequencies the same, the voltage of the supply source may change without causing error. The voltage across condenser 11 may be measured by a vacuum tube voltmeter indicated at 3, or a control circuit indicated at 17 may be used for control purposes. Thus the condenser 11 energized by my improved frequency comparing circuit may replace the condenser 10 in the weft-straightener system of my United States Letters Patent No. 2,209,220, July 23, 1940. The frequency difference measuring apparatus of my present invention is more simple and accurate than the arrangement described in the above mentioned patent.

For frequency relations of the order mentioned in the example given herein, the condenser 10 may be a 0.1-microfarad condenser and condenser 11 a 4-microfarad condenser, and I may use 375 volts supply across the secondary of transformer 9. The grid leaks shown in the grid control circuits of the tubes 7, 8, 12, and 13 may each comprise a 0.05-microfarad condenser shunted by a 0.1-megohm resistor. These apply a negative direct current bias on the grids of the tubes making it impossible for the two tubes charging and discharging the condenser 10 to pass current at the same instant when the input voltages of $f_1$ and $f_2$ pass through zero. The heaters for the cathodes of these tubes may be energized from a secondary winding 18 of transformer 9.

What I claim as new and desire to secure by Letters Patent of the United States, is:

1. Apparatus for comparing two frequencies designated as $f_1$ and $f_2$, a source of alternating current supply of substantially lower frequency than the frequencies to be compared, a condenser, means for charging and discharging said condenser at the $f_1$ frequency during the half-cycles of one polarity of said source, means for charging and discharging said condenser at the $f_2$ frequency during the half-cycles of opposite polarity of said source, a larger condenser, and connections for obtaining the charging currents of the first-mentioned condenser from said source and passing the same through the larger condenser in opposite directions whereby a voltage is built up on said larger condenser proportional to the voltage of said source multiplied by $$\left(\frac{f_1-f_2}{f_1+f_2}\right)$$

2. Apparatus for comparing two frequencies designated as $f_1$ and $f_2$, a source of alternating current supply of substantially lower frequency than the $f_1$ and $f_2$ frequencies, a small condenser, thermionic means for alternately charging and discharging said condenser at the $f_1$ frequency rate when said source is in one polarity, thermionic means for alternately charging and discharging said condenser at the $f_2$ frequency rate when said source is of the opposite polarity, a large condenser, and connections whereby the charging currents of said small condenser are supplied from said source and passed through said large condenser in opposite directions producing a voltage thereon proportional to $$\frac{f_1-f_2}{f_1+f_2}$$

multiplied by the voltage of said source and of a polarity dependent upon which is greater $f_1$ or $f_2$.

3. Apparatus for comparing two frequencies designated as $f_1$ and $f_2$, a source of alternating current supply having a frequency appreciably lower than the $f_1$ and $f_2$ frequencies, a small condenser, a large condenser, a thermionic device for connecting said condensers in series to said source of supply on each half-cycle of one polarity of the $f_1$ frequency when said source is of one polarity, a thermionic device for connecting said condensers in series to said source of supply on each half-cycle of one polarity of the $f_2$ frequency when said source is of the opposite polarity, and thermionic means for discharging only the small condenser each time it is charged, whereby there is built up on the large condenser a voltage proportional to $$\left(\frac{f_1-f_2}{f_1+f_2}\right)$$

times the voltage of said source of supply.

THEODORE M. BERRY.